Aug. 14, 1923.

E. P. CAMPBELL 1,464,693

BEARING EXTRACTOR

Filed Sept. 12, 1921

INVENTOR.
Ernest P. Campbell
BY
ATTORNEY

Patented Aug. 14, 1923.

1,464,693

UNITED STATES PATENT OFFICE.

ERNEST P. CAMPBELL, OF STOCKTON, CALIFORNIA.

BEARING EXTRACTOR.

Application filed September 12, 1921. Serial No. 499,971.

*To all whom it may concern:*

Be it known that I, ERNEST P. CAMPBELL, a citizen of the United States, residing at Stockton, county of San Joaquin, State of California, have invented certain new and useful Improvements in Bearing Extractors; and I do declare the following to be a full, clear, and exact description of the same, reference being had to the accompanying drawings, and to the characters of reference marked thereon, which form a part of this application.

This invention relates to improvements in tools for extracting entire bearings, whether of the ball or solid type, the principal object being to provide a device of this character particularly adapted to be used for the extracting the bearings from the casings or housings of the generators or starters of Ford cars.

Another object is to so design the device that it will positively extract the bearing, and without straining or tending to warp or squeeze the same during the pulling operation. I have also designed an extractor with the least possible number of parts, and without sacrificing anything of efficiency in so doing.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
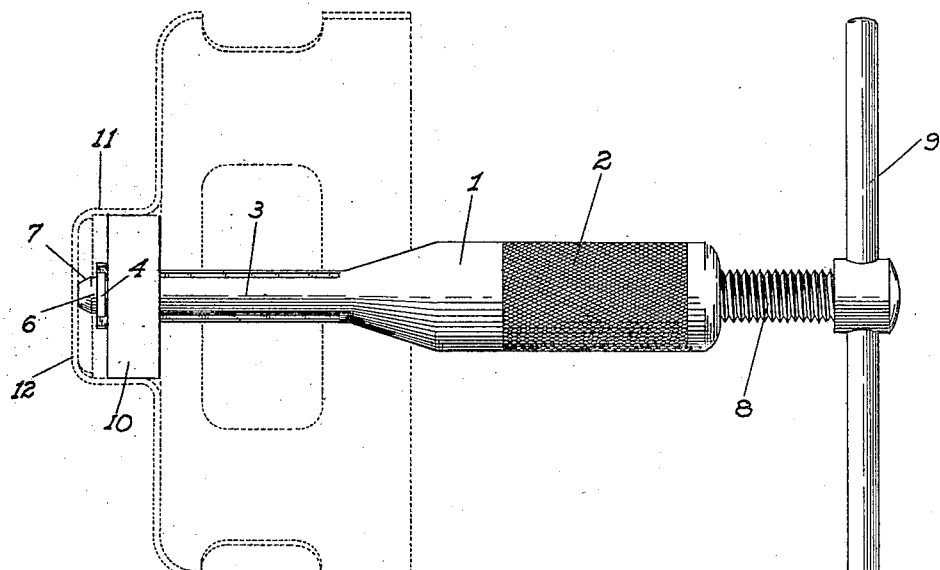
Fig. 1 is an exterior elevation of my extractor, showing the same operating on a bearing of the type above described.
Figure 2:
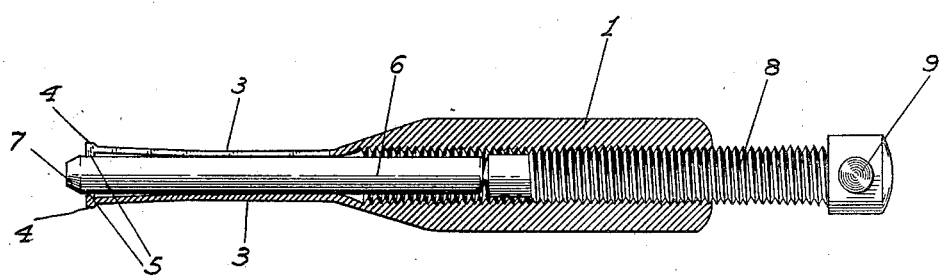
Fig. 2 is a sectional elevation of the extractor.
Figure 3:
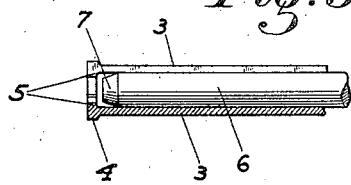
Fig. 3 is a fragmentary section at the jaw end of the extractor, showing the jaws contracted or normal.

Referring now more particularly to the characters of reference on the drawings, the numeral 1 denotes a hollow shank, knurled on its outer surface as at 2 to enable it to be gripped by hand, and provided with a plurality of integrally formed spring jaws 3 at one end, the jaws together forming a hollow cylinder. The jaws, at their outer ends, have outwardly projecting shoulders or collars 4 which together form a ring, while similar sized and arranged shoulders 5 project inwardly of the jaws. Slidably mounted with a neat fit in the shank is a pin 6, having a tapered head 7 the diameter of which at the outer and small end is less than that of the shoulders 5.

Threaded into the opposite end of the shank is a screw 8 having a handle member 9 on its outer end, this screw being adapted to bear against the inner end of the pin.

The jaws and outer shoulders thereon are of such a diameter as to permit them, when in their normal or closed position, to pass neatly through the bore of a bearing 10 which is seated in a cup in a housing 11 a sufficient distance from the end wall 12 thereof to permit the width of the shoulders 4 resting therebetween.

In order to extract the bearing, the jaws are inserted through the bearing as stated, and the screw 8 then turned. This causes the pin 6 to be moved outwardly, the taper head thereof pressing against the shoulders 5 and forcing the jaws outwardly until the said shoulders rest on the main portion of the pin, when the limit of expansion of the jaws has been reached. The collars 4 then project beyond the bore of the bearing, and when the screw is turned further, the pin will bear against the wall 12 and not being able to move away further, will remain stationary while the shank and jaws move in the opposite direction drawing the bearing therewith without any binding or gripping action, but with an even and steady pressure.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. A bearing extractor comprising a hollow shank having a plurality of jaws at one end, said jaws being normally adapted to pass through the bore of a bearing and enclosing a hollow area, inwardly projecting shoulders on the jaws, and a cylindrical pin having a short taper on its outer end fitted in the hollow area, said pin being of larger diameter than said shoulders and adapted to be moved outwardly of the jaws, such movement being able to be continued after the taper portion of the pin has passed outwardly of the shoulders.

2. A bearing extractor comprising a hollow shank having a plurality of jaws at one end, said jaws being normally adapted to pass through the bore of a bearing and enclosing a hollow area, a pin fitted in the hollow area for expanding the jaws, and means permitting movement of the pin beyond the outer ends of the jaws after the latter have been expanded to their full extent.

In testimony whereof I affix my signature.

ERNEST P. CAMPBELL.